(12) United States Patent
Ni

(10) Patent No.: US 9,374,858 B2
(45) Date of Patent: Jun. 21, 2016

(54) SOLID-STATE LIGHTING APPARATUS AND METHODS USING SWITCHED ENERGY STORAGE

(75) Inventor: Liqin Ni, Morrisville, NC (US)

(73) Assignee: Cree, Inc., Durham, NC (US)

( * ) Notice: Subject to any disclaimer, the term of this patent is extended or adjusted under 35 U.S.C. 154(b) by 1067 days.

(21) Appl. No.: 13/476,259

(22) Filed: May 21, 2012

(65) Prior Publication Data

US 2013/0307415 A1    Nov. 21, 2013

(51) Int. Cl.
*H05B 37/02* (2006.01)
*H05B 33/08* (2006.01)

(52) U.S. Cl.
CPC .......... *H05B 33/0812* (2013.01); *H05B 33/083* (2013.01); *Y02B 20/345* (2013.01)

(58) Field of Classification Search
CPC ............... H05B 37/02; H05B 33/0884; H05B 33/0842; H05B 33/0827; H05B 33/0812; H05B 33/083; Y02B 20/345
USPC .......... 315/122, 185 R, 188–189, 200 R, 235, 315/241 R, 325, 339
See application file for complete search history.

(56) References Cited

U.S. PATENT DOCUMENTS

| | | |
|---|---|---|
| 4,504,776 A | 3/1985 | Haville |
| 5,059,890 A | 10/1991 | Yoshikawa et al. |
| 5,504,448 A | 4/1996 | Bennett et al. |
| 5,803,579 A | 9/1998 | Turnbull et al. |
| 6,137,235 A | 10/2000 | Franck |
| 6,469,455 B1 * | 10/2002 | Inoue ................. H05B 33/0803 315/169.3 |
| 6,556,067 B2 | 4/2003 | Henry |
| 6,798,152 B2 | 9/2004 | Rooke et al. |
| 7,088,059 B2 | 8/2006 | McKinney et al. |
| 7,271,545 B2 | 9/2007 | Hu et al. |
| 7,291,983 B2 | 11/2007 | Hu et al. |
| 7,649,326 B2 | 1/2010 | Johnson et al. |
| 7,994,725 B2 | 8/2011 | Bouchard |
| 8,174,201 B2 | 5/2012 | Lee |
| 8,519,630 B2 | 8/2013 | Wang et al. |
| 8,525,774 B2 | 9/2013 | Lin et al. |
| 8,791,641 B2 | 7/2014 | van de Ven et al. |
| 2002/0097095 A1 | 7/2002 | Jeon et al. |
| 2004/0036418 A1 | 2/2004 | Rooke et al. |
| 2005/0057179 A1 | 3/2005 | Madhani et al. |

(Continued)

FOREIGN PATENT DOCUMENTS

TW    I294256    3/2008

OTHER PUBLICATIONS

International Search Report Corresponding to International Application No. PCT/US12/54869; Date of Mailing: Nov. 23, 2012; 10 Pages.

(Continued)

*Primary Examiner* — Jimmy Vu
*Assistant Examiner* — Henry Luong
(74) *Attorney, Agent, or Firm* — Myers Bigel & Sibley, P.A.

(57) ABSTRACT

An apparatus includes at least one LED, at least one charge storage device and a switching circuit configured to route current through the least one LED to the at least one charge storage device for a first state of an applied voltage and to discharge the at least one charge storage device via the at least one LED for a second state of the applied voltage. The apparatus may further include a current control circuit coupled in series with the at least one LED.

23 Claims, 11 Drawing Sheets

(56) References Cited

U.S. PATENT DOCUMENTS

| | | |
|---|---|---|
| 2005/0179629 A1 | 8/2005 | Inoue |
| 2006/0261754 A1 | 11/2006 | Lee |
| 2007/0013620 A1 | 1/2007 | Tanahashi et al. |
| 2007/0096661 A1 | 5/2007 | Allen |
| 2007/0108843 A1 | 5/2007 | Preston et al. |
| 2007/0257623 A1 | 11/2007 | Johnson et al. |
| 2008/0094000 A1 | 4/2008 | Yamamoto et al. |
| 2008/0122376 A1 | 5/2008 | Lys |
| 2009/0179593 A1* | 7/2009 | Yang ............ 315/307 |
| 2009/0195168 A1 | 8/2009 | Greenfeld |
| 2010/0060175 A1 | 3/2010 | Lethellier |
| 2010/0072902 A1 | 3/2010 | Wendt et al. |
| 2010/0109537 A1 | 5/2010 | Nishino et al. |
| 2010/0109570 A1 | 5/2010 | Weaver |
| 2010/0194274 A1 | 8/2010 | Hoogzaad |
| 2010/0308738 A1* | 12/2010 | Shteynberg et al. ...... 315/185 R |
| 2010/0308739 A1 | 12/2010 | Shteynberg et al. |
| 2010/0315016 A1 | 12/2010 | Hoogzaad |
| 2011/0025217 A1 | 2/2011 | Zhan et al. |
| 2011/0109228 A1 | 5/2011 | Shimomura et al. |
| 2011/0148314 A1 | 6/2011 | Lin et al. |
| 2012/0176826 A1 | 7/2012 | Lazar |
| 2012/0194073 A1 | 8/2012 | Wang et al. |
| 2013/0069547 A1* | 3/2013 | van de Ven et al. .......... 315/188 |
| 2013/0278157 A1 | 10/2013 | Radermacher |

OTHER PUBLICATIONS

International Search Report Corresponding to International Application No. PCT/US12/54888; Date of Mailing: Nov. 23, 2012; 12 Pages.

International Preliminary Report on Patentability Corresponding to International Application No. PCT/US2012/054888; Date of Mailing: Mar. 27, 2014; 10 Pages.

International Preliminary Report on Patentability Corresponding to International Application No. PCT/US2012/054869; Date of Mailing: Mar. 27, 2014; 8 Pages.

International Preliminary Report on Patentability Corresponding to International Application No. PCT/US2012/040189; Date of Mailing: Dec. 19, 2013, 13 Pages.

Taiwanese Office Action Corresponding to Application No. 101131404; Dated: Nov. 19, 2015; Foreign Text Only, 15 pages.

European Search Report Corresponding to European Application No. 12 83 2595; Dated: Oct. 7, 2015; 6 Pages.

* cited by examiner

SOLID-STATE LIGHTING APPARATUS AND METHODS USING SWITCHED ENERGY STORAGE

FIELD

The present inventive subject matter relates to lighting apparatus and methods and, more particularly, to solid-state lighting apparatus and methods.

BACKGROUND

Solid-state lighting arrays are used for a number of lighting applications. For example, solid-state lighting panels including arrays of solid-state light emitting devices have been used as direct illumination sources in architectural and/or accent lighting. A solid-state light emitting device may include, for example, a packaged light emitting device including one or more light emitting diodes (LEDs), which may include inorganic LEDs, which may include semiconductor layers forming p-n junctions and/or organic LEDs (OLEDs), which may include organic light emission layers.

Solid-state lighting devices are also used in lighting fixtures, such as incandescent bulb replacement applications, task lighting, recessed light fixtures and the like. For example, Cree, Inc. produces a variety of recessed downlights, such as the LR-6 and CR-6, which use LEDs for illumination. Solid-state lighting panels are also commonly used as backlights for small liquid crystal display (LCD) screens, such as LCD display screens used in portable electronic devices, and for larger displays, such as LCD television displays.

Some attempts at providing solid-state lighting sources have involved driving an LED or string or group of LEDs using a rectified voltage produced from an AC source. However, because the LEDs generally require a minimum forward voltage to turn on, the LEDs may turn on for only a part of the rectified AC waveform, which may result in visible flickering, may undesirably lower the power factor of the system, and/or may increase resistive loss in the system. Examples of techniques for driving LEDs with a rectified AC waveform are described in U.S. Patent Application Publication No. 2010/0308738. Co-pending U.S. patent application Ser. No. 13/235,103, entitled "Solid-State Lighting Apparatus and Methods Using Energy Storage", filed Sep. 16, 2011 and Ser. No. 13/405,819, entitled "Solid-State Lighting Apparatus and Methods Using Energy Storage", filed Feb. 27, 2012, each of which is commonly assigned to the assignee of the present application, describe techniques in which a capacitor or other energy storage device may be used to sustain light output during nulls of the waveform of an AC power source used to power a lighting apparatus. Other attempts at providing AC-driven solid-state lighting sources have involved placing LEDs in an anti-parallel configuration, so that half of the LEDs are driven on each half-cycle of an AC waveform.

SUMMARY

Some embodiments provide an apparatus including at least one LED, at least one charge storage device and a switching circuit configured to route current through the least one LED to the at least one charge storage device for a first state of an applied voltage and to discharge the at least one charge storage device via the at least one LED for a second state of the applied voltage.

The apparatus may further include a current control circuit coupled in series with the at least one LED. The current control circuit may be configured to limit a current through the at least one LED for a third state of the applied voltage. The current control circuit may include a current mirror circuit.

In some embodiments, a first terminal of the at least one LED may be configured to receive the applied voltage, a second terminal of the at least one LED may be coupled to the current control circuit and the switching circuit may be configured to selectively conduct current to the at least one charge storage device from the second terminal of the at least one LED responsive to the applied voltage.

In some embodiments, the applied voltage may be a periodically varying voltage and a current through the at least one LED may have a frequency twice a frequency of the applied voltage.

In some embodiments, the switching circuit may include a first switch coupled between a first terminal of the at least one LED and a first terminal of the at least one charge storage device and a second switch coupled between a second terminal of the at least one LED and the first terminal of the at least on charge storage device. The first switch may include a first diode coupled between a first terminal of the at least one LED and a first terminal of the at least one charge storage device. The second switch may include a second diode coupled between a second terminal of the at least one LED and the first terminal of the at least on charge storage device.

In further embodiments, the apparatus may further include a string of LEDs coupled in series with the at least one LED. The apparatus may also include bypass circuitry configured to selectively bypass LEDs in the string responsive to the applied voltage.

Further embodiments of the inventive subject matter provide apparatus including a plurality of lighting circuits coupled in series. Each of the lighting circuits includes at least one LED, at least one charge storage device and a switching circuit configured to route current through the least one LED to the at least one charge storage device for a first state of an applied voltage and to discharge the at least one charge storage device via the at least one LED for a second state of the applied voltage. Each of the lighting circuits may further include a current control circuit coupled in series with the at least one LED.

In some embodiments of the inventive subject matter, an apparatus includes at least one LED, at least one charge storage device, a first switch coupled between a first terminal of the at least one LED and a first terminal of the at least one charge storage device and a second switch coupled between a second terminal of the at least one LED and the first terminal of the at least one charge storage device. The first and second switches are configured to route current through the least one LED to the at least one charge storage device for a first state of a voltage applied to the first terminal of the at least one LED and to discharge the at least one charge storage device via the at least one LED for a second state of the applied voltage. The first and second switches may include respective first and second diodes. The apparatus may further include a current control circuit coupled to the second terminal of the at least one LED. A string of LEDs may be coupled in series with the at least one LED, and the apparatus may further include bypass circuitry configured to selectively bypass LEDs in the string responsive to the applied voltage.

Some embodiments provide a controller for a lighting apparatus comprising at least one LED. The controller includes a switching circuit configured to route current through the at least one LED to at least one charge storage device for a first state of an applied voltage and to discharge the at least one charge storage device via the at least one LED for a second state of the applied voltage. The switching circuit may include a first switch configured to be coupled between a first terminal of the at least one LED and a first terminal of the at least one charge storage device and a second switch configured to be coupled between a second terminal of the at least one LED and the first terminal of the at least one charge storage device. The first and second switches may include respective first and second diodes. The controller may further include a current control circuit configured to be coupled in series with the at least one LED.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Figure 1:
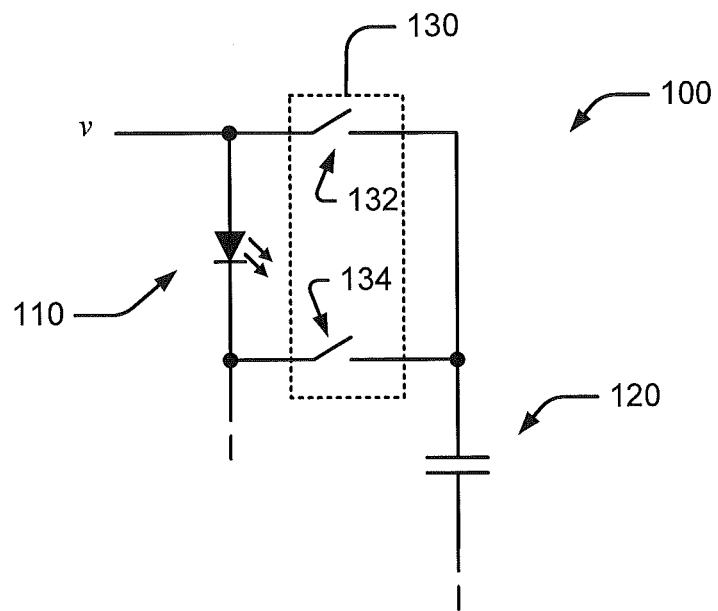
FIG. 1 illustrates a lighting apparatus according to some embodiments.

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be further understood that elements "coupled in series" or "serially connected" may be directly coupled or may be coupled via intervening elements.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device. The present inventive subject matter may further relate to an illuminated enclosure (the volume of which can be illuminated uniformly or non-uniformly), comprising an enclosed space and at least one lighting apparatus according to the present inventive subject matter, wherein the lighting apparatus illuminates at least a portion of the enclosed space (uniformly or non-uniformly).

FIG. 1 illustrates a lighting apparatus 100 according to some embodiments of the inventive subject matter. The lighting apparatus 100 includes at least one LED 110, which is configured to have a varying voltage v, such as a rectified AC voltage, applied thereto. In FIG. 1, the at least one LED 110 is conceptually illustrated as a single LED, but it will be understood that the at least one LED 110 may include multiple serially-connected LEDs, two or more parallel-connected LEDs and/or multiple sets of parallel and/or serially-connected LEDs.

The apparatus 100 further includes a switching circuit 130, which is configured to selectively couple first and second terminals of the at least one LED 110 to at least one charge storage device, e.g., at least one capacitor 120. For example, the switching circuit 130 may include a first switch 132 configured to couple an anode terminal of the at least one LED 110 to a first terminal of the at least one capacitor 120, and a second switch 134 configured to selectively couple a cathode terminal of the at least one LED 110 to the at least one capacitor 120.

According to some embodiments, the applied voltage v may be a varying voltage, such as a rectified voltage produced from an AC power source. The switching circuit 130 may be configured to pass current through the at least one LED 110 and into the at least one capacitor 120 via the second switch 134 when the applied voltage v rises to a level sufficient to cause forward conduction through the at least one LED 110 and to discharge the at least one capacitor 120 through the at least one LED 110 when the applied voltage v falls to a level insufficient to cause forward conduction of the at least one LED 110. In this manner, illumination of the at least one LED 110 may be maintained at and/or near nulls of the rectified applied voltage v.

Figure 2:
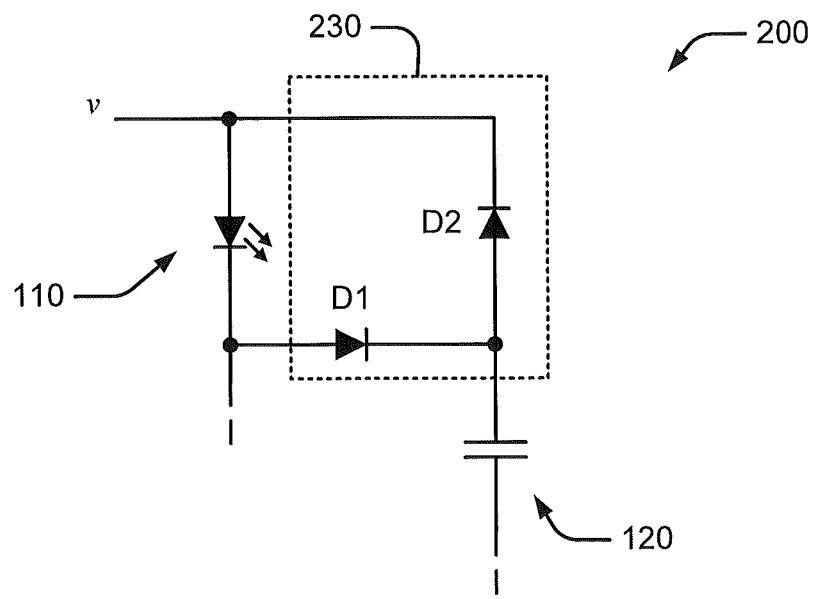
FIG. 2 illustrates a lighting apparatus using diodes for switches according to some embodiments.

A switching circuit that provides functions along the lines of those provided by the switching circuit 130 of FIG. 1 may be implemented in a number of different ways. For example, FIG. 2 shows a lighting apparatus 200 including at least one LED 110 and at least one capacitor 120, along with a switching circuit 200 including first and second diodes D1, D2. The diodes D1, D2 may function as voltage-controlled switches in a manner along the lines described above. In particular, when an applied voltage v reaches a level sufficient to cause forward conduction through the at least one LED 110 and the first switching diode D1, current begins to pass through the at least one LED 110 and the first switching diode D1 to charge the at least one capacitor 120. When the applied voltage v falls to a level insufficient to cause forward conduction through the at least one LED 110 and the first diode D1 and sufficient to cause forward conduction through the diode D2 (i.e., when the voltage at the junction of the at least one capacitor 120 and the diodes D1 and D2 is greater than the sum of applied voltage v and the forward voltage of the diode D2), the at least one capacitor 120 discharges through the diode D2 and the at least one LED 110, thus maintaining illumination of the at least one LED 110.

It will be appreciated that the switching diodes D1, D2 may be conventional PN junction diodes or other types of diodes or diode-like devices, including LEDs. It will be further appreciated that other types of semiconductor switching devices may be used in place of the diodes D1, D2. For example, transistors or other semiconductor switching devices may be used in place of the diodes D1, D2 and the switching circuit 230 may include control circuitry configured to control such devices responsive to the applied voltage v and/or other parameters.

Figure 3:
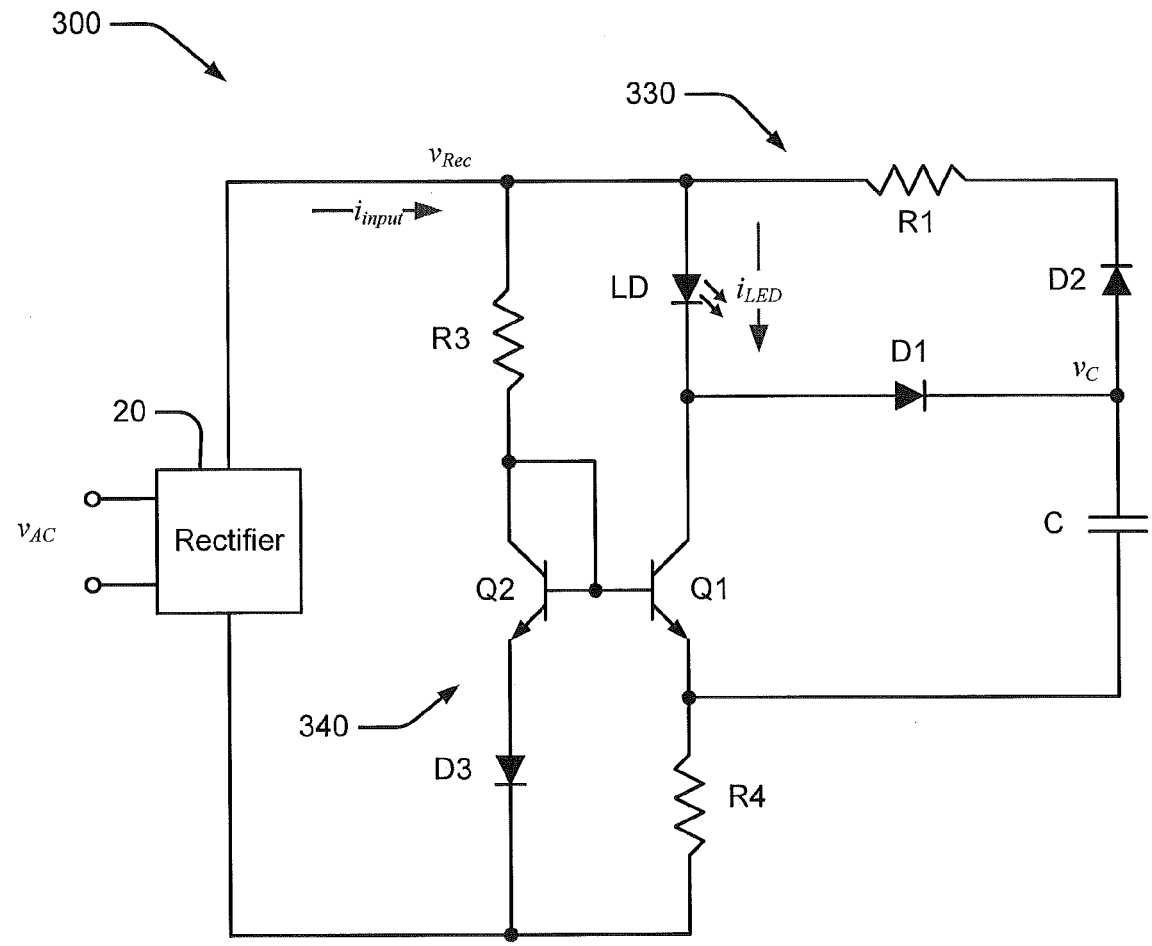
FIG. 3 illustrates a lighting apparatus according to further embodiments.

FIG. 3 illustrates a lighting apparatus 300 according to further embodiments of the inventive subject matter. The lighting apparatus 300 includes at least one LED LD, which may include a single LED or various combinations of parallel and/or serially connected plural LEDs. The at least one LED LD is coupled to a rectifier circuit 20, which produces a full-wave rectified voltage $v_{rec}$ from an AC input voltage $v_{AC}$. The apparatus 300 further includes a switching circuit 330 configured to selectively couple the at least one LED LD to at least one capacitor C. The switching circuit 330 may include first and second diodes D1, D2 and a current-limiting resistor R1 (in some embodiments, an additional current-limiting resistor may be coupled in series with the first diode D1). The switching circuit 330 may operate responsive to the rectified voltage $v_{rec}$ in a manner similar to that described above with reference to FIG. 2. The apparatus 300 further includes a current control circuit 340, which is configured to limit current passing through the at least one LED LD. In the illustrated embodiments, the current control circuit 340 takes the form of a current mirror comprising first and second transistors Q1, Q2, along with resistors R3, R4 and a diode D3.

Figure 4:
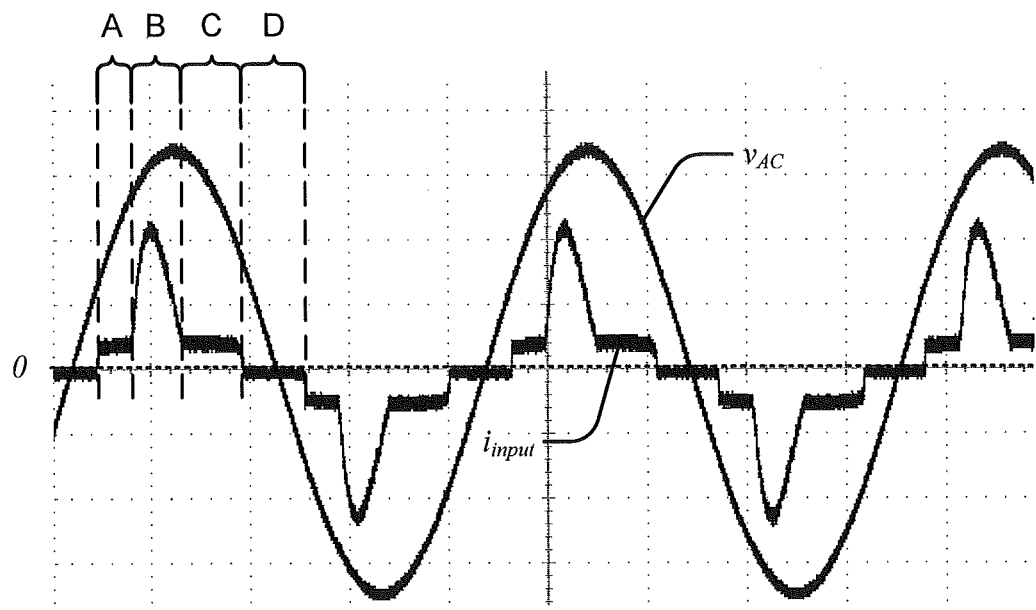
FIGS. 4 and 5 illustrate current and voltage waveforms for the apparatus of FIG. 3.

Operation of the apparatus 300 may be explained by reference to FIGS. 4 and 5. When the rectified voltage $v_{rec}$ reaches a level sufficient to cause forward conduction through the at least one LED LD but insufficient to cause current flow through the first switching diode D1, current flows through the at least one LED LD at a level controlled by the current control circuit 340 during an interval A. When the rectified voltage $v_{rec}$ reaches a level sufficient to turn on the first switching diode D1, current passes from the at least one LED LD and through the first diode D1 to charge the at least one capacitor C while maintaining illumination of the at least one LED LD during an interval B.

When the rectified voltage $v_{rec}$ and the voltage $v_c$ of the at least one capacitor C reach a state that no longer supports forward conduction through the first switching diode D1 (i.e., the difference between the rectified voltage $v_{rec}$ and the voltage $v_c$ is less than the combined forward voltage of the at least one LED LD and the first diode D1), conduction through the first diode D1 ceases and current passing through the at least one LED LD is again limited by the current control circuit 340 during an interval C. As the rectified voltage $v_{rec}$ further decreases to a level less than a diode drop above the capacitor voltage $v_c$, the second switching diode D2 begins to conduct, allowing the at least one capacitor C to discharge through the at least one LED LD during an interval D, thereby maintaining illumination of the at least one LED LD at and near the null in the rectified voltage $v_{rec}$.

Figure 5:
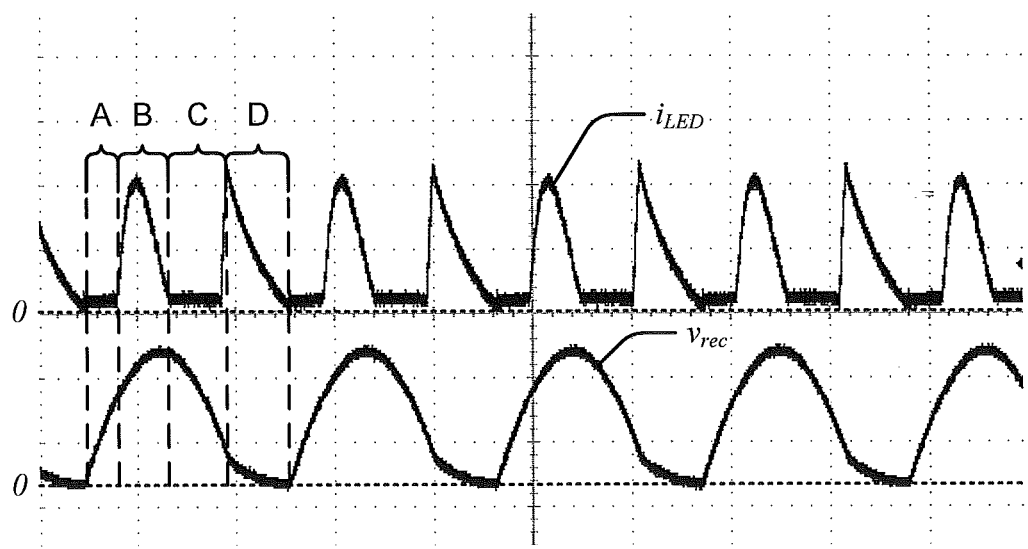

As can be seen from FIG. 5, this results in a waveform for the current $i_{LED}$ through the at least one LED LD that pulses at a frequency that is twice the frequency of the rectified voltage $v_{rec}$ and four times the frequency of the input AC voltage $v_{AC}$. This can be advantageous, as the light output of the at least one LED LD will thus pulse at a rate that is four times the fundamental frequency of the input AC waveform. For example, for a 60 Hz AC source, the at least one LED will pulse at a rate of 240 Hz, which may result in flicker that is less perceptible to the human eye than the flicker typically produced by AC-driven LED lighting apparatus using other drive circuit configurations.

Figure 6:
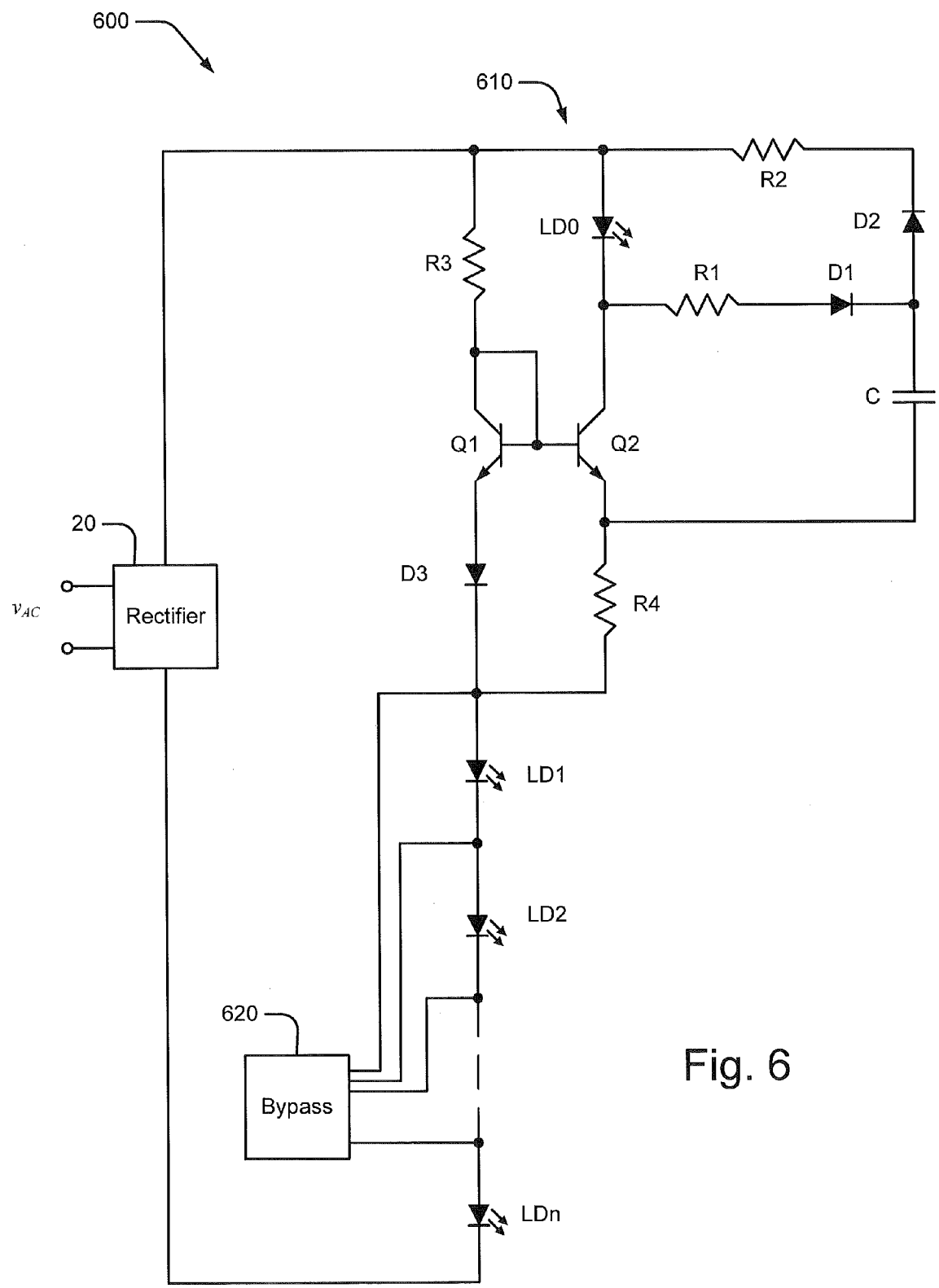
FIG. 6 illustrates a lighting apparatus including a string of selectively bypassable LED segments and an LED segment with energy storage according to some embodiments.

According to further embodiments, lighting circuits along the lines described above with reference to FIGS. 1-5 may be combined with circuitry that that selectively activates components of an LED string responsive to a rectified AC waveform. FIG. 6 illustrates such a lighting apparatus 600 according to some embodiments. The lighting apparatus 600 includes a lighting circuit 610 with capacitive energy storage having a configuration like that illustrated in FIG. 3. The lighting circuit 610 includes at least one LED LD, a switching circuit including diodes D1, D2 and current-limiting resistors R1, R2 and a current control circuit including transistors Q1, Q2, a diode D3 and resistors R3, R4. The lighting circuit 610 is configured to operate in the manner similar to that described above with reference to FIGS. 3-5.

The apparatus 600 further includes a string of selectively bypassable LED sets LD1-LDn, each including at least one LED, coupled in series with the lighting circuit 610. A bypass circuit 620 is coupled to nodes of the string and is configured to selectively bypass the LED sets LD1-LDn responsive to a rectified voltage $v_{rec}$ produced by a rectifier circuit 20 from an AC source voltage $v_{AC}$. The bypass circuit 620 may operate such that the LED sets LD1-LDn are incrementally energized and de-energized as the rectified voltage $v_{rec}$ varies. The bypass circuit 620 may take any of a variety of different forms, such as bypass circuits described in co-pending U.S. patent application Ser. No. 13/235,127, entitled "Solid-State Lighting Apparatus and Methods Using Current Diversion Controlled by Lighting Device Bias States," filed Sep. 16, 2011, U.S. patent application Ser. No. 13/339,974, entitled "Solid-State Lighting Apparatus and Methods Using Parallel-Connected Segment Bypass Circuits," filed Dec. 29, 2011 and U.S. patent application Ser. No. 12/566,142, entitled "Solid State Lighting Apparatus With Configurable Shunts," filed Sep. 24, 2009, the disclosures of which are incorporated herein by reference.

Figure 7:
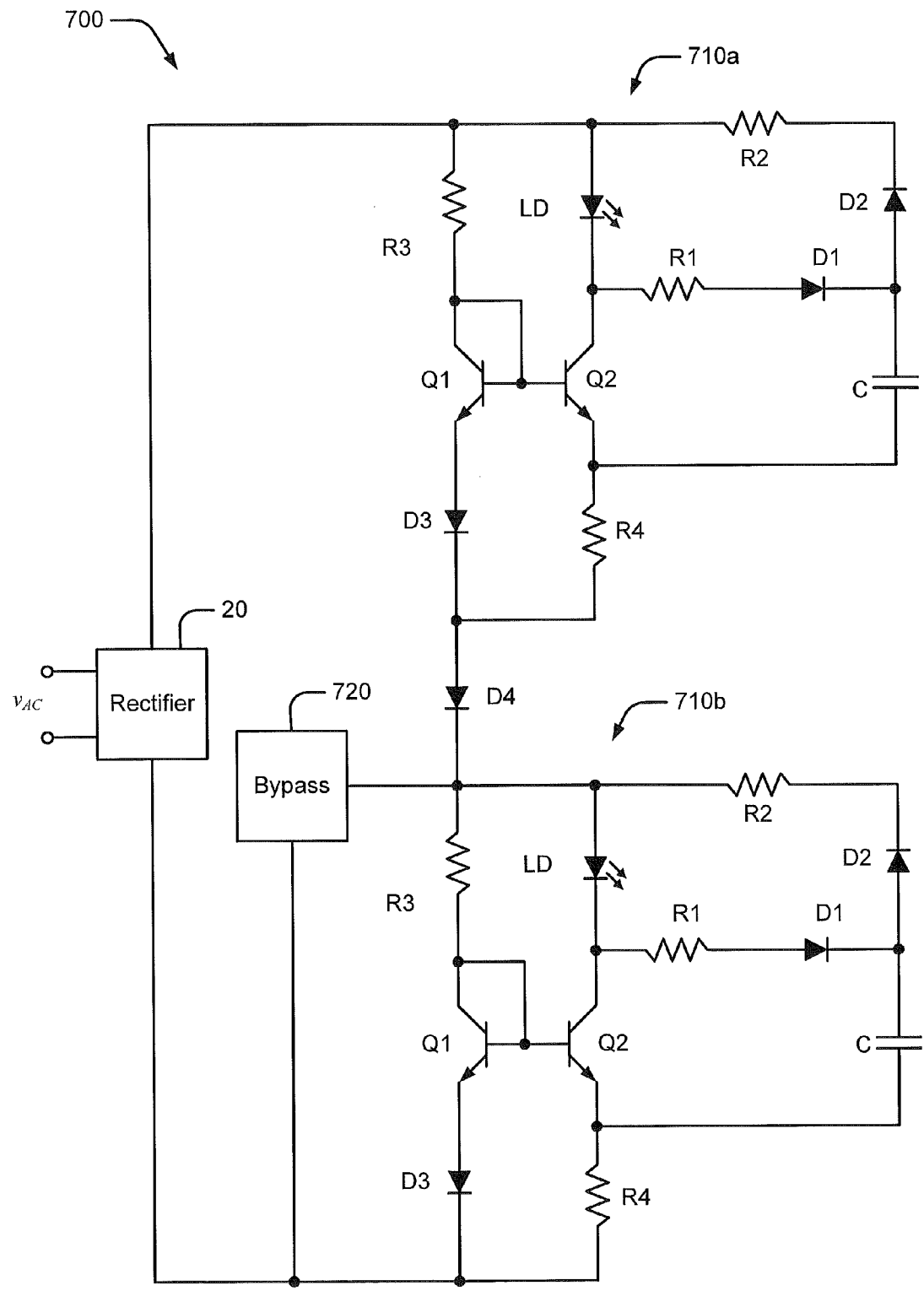
FIG. 7 illustrates a lighting apparatus with multiple segments with energy storage according to further embodiments.

According to further embodiments, multiple LED lighting circuits with energy storage along the lines described above may be combined in a string with selective bypass circuitry. FIG. 7 illustrates such a lighting apparatus 700 according to some embodiments. The lighting apparatus 700 includes a string including first and second lighting circuits 710a, 710b, each with capacitive energy storage. The lighting circuits 710a, 710b each include at least one LED LD, a switching circuit including diodes D1, D2 and resistors R1, R2 and a current control circuit including transistors Q1, Q2, a diode D3 and resistors R3, R4. Each of the lighting circuits 710a, 710b may be configured to operate in the manner described above with reference to FIGS. 3-5. A bypass circuit 720 may be configured to selectively bypass the second lighting circuit 710b responsive to a rectified voltage $v_{rec}$ applied to the string by a rectifier circuit 20, such that the first and second lighting circuits 710a, 710b are sequentially activated and deactivated as the rectified voltage $v_{rec}$ varies. It will be appreciated that, although the apparatus 700 of FIG. 7 includes two lighting circuits 710a, 710b, further embodiments may include three or more such circuits connected in series.

Embodiments of the inventive subject matter may be implemented in any of a variety of different forms, including, but not limited to lighting apparatus, such as lighting modules and fixtures, as well as control circuitry (e.g., integrated circuit devices, circuit modules and/or other devices) configured to be used in conjunction with LEDs and circuit components, such as storage capacitors, in such lighting apparatus.

Figure 8:
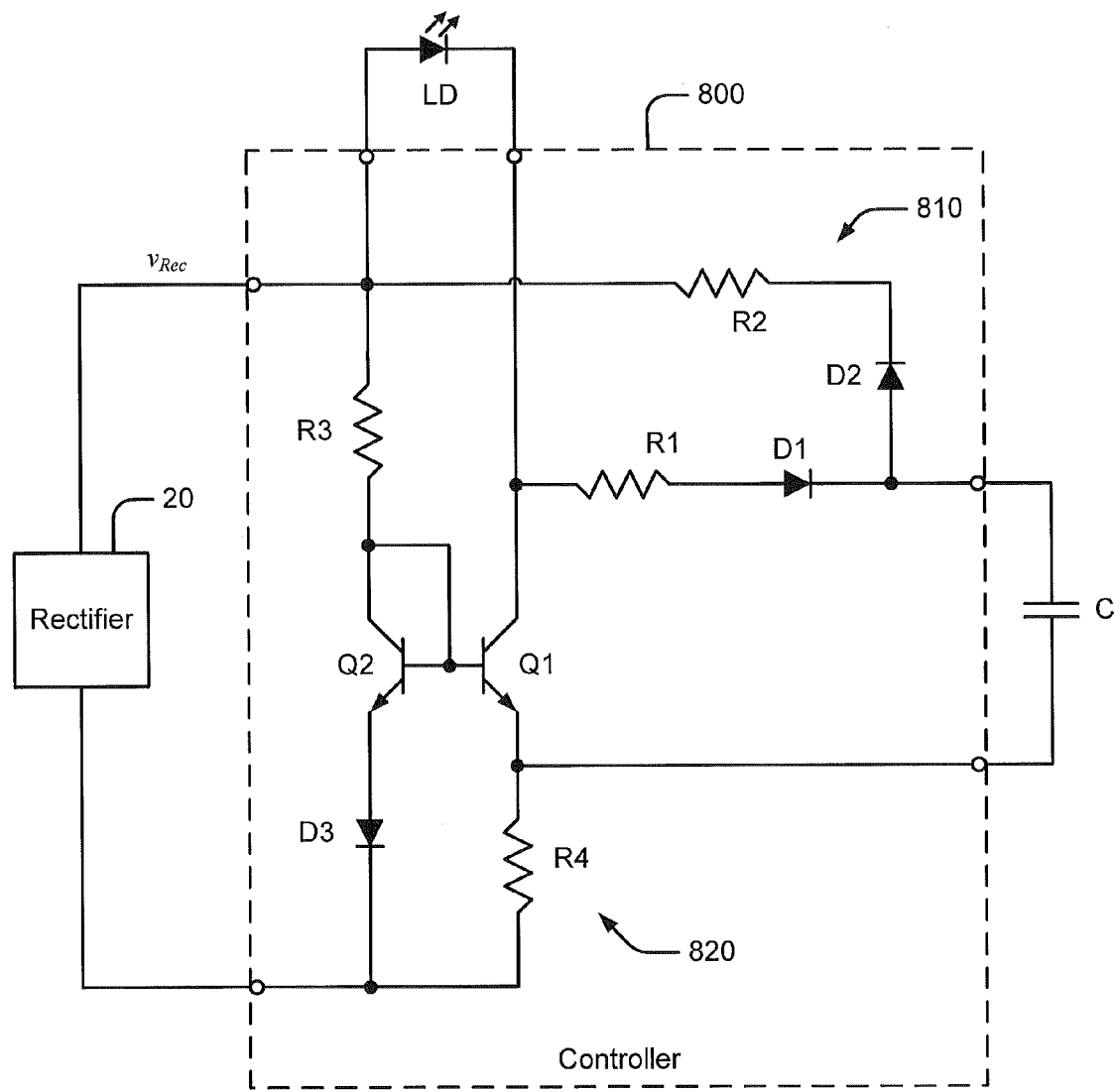
FIGS. 8-10 illustrate controllers for a lighting apparatus according to various embodiments.
Figure 9:
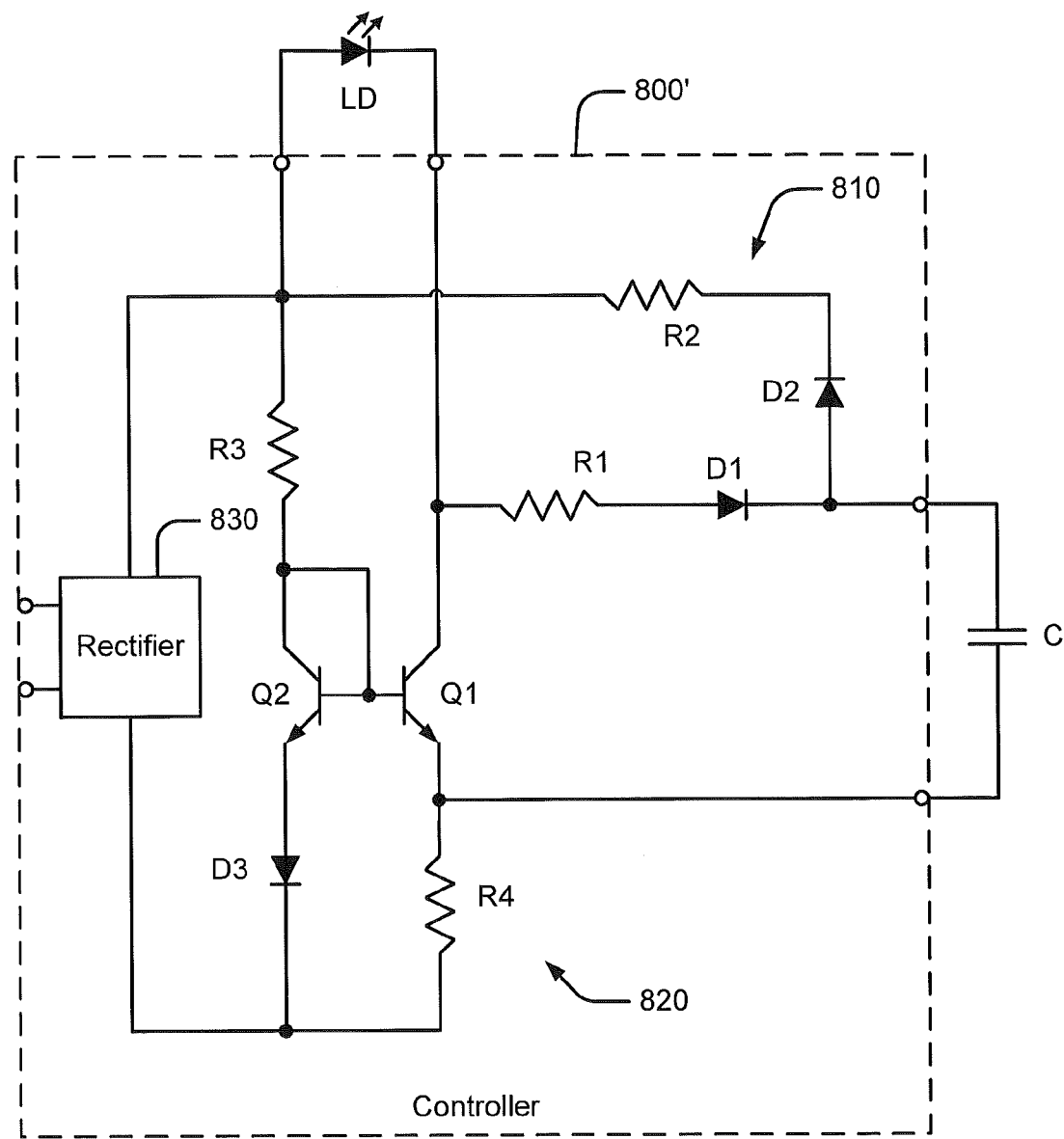

For example, FIG. 8 illustrates a controller 800 configured to be coupled to at least one LED LD and at least one capacitor C to form a lighting apparatus. The controller 800 may include, for example, a switching circuit 810 including diodes D1, D2 and resistors R1, R2, and a current control circuit 820 including transistors Q1, Q2, a diode D3, and resistors R3, R4. The controller 800 may be configured to be coupled to an external rectifier 20, e.g., a diode bridge, which provides a rectified voltage $v_{rec}$. The controller 800 may be implemented, for example, using one or more integrated circuit devices and/or one or more circuit modules (e.g., circuit cards and/or hybrid modules). Such devices or modules may be integrated with LEDs and/or charge storage devices in, for example, a lighting fixture, lamp or other lighting apparatus. In further embodiments illustrated in FIG. 9, a controller 800' may further include a rectifier circuit 830 integrated therein to support a plug-in AC capability. In further embodiments, the one or more storage capacitors C may also integrated with the other control circuitry. In still further embodiments, circuit components of controllers along the lines of the controllers 800, 800', such as the resistors R1-R4, may be selectable (e.g., externally located and/or removably connected to a controller module) to afford users with the ability to set performance characteristics for particular applications, e.g., for particular types and/or arrangements of LEDs by selecting resistors with particular values suited to the application.

Figure 10:
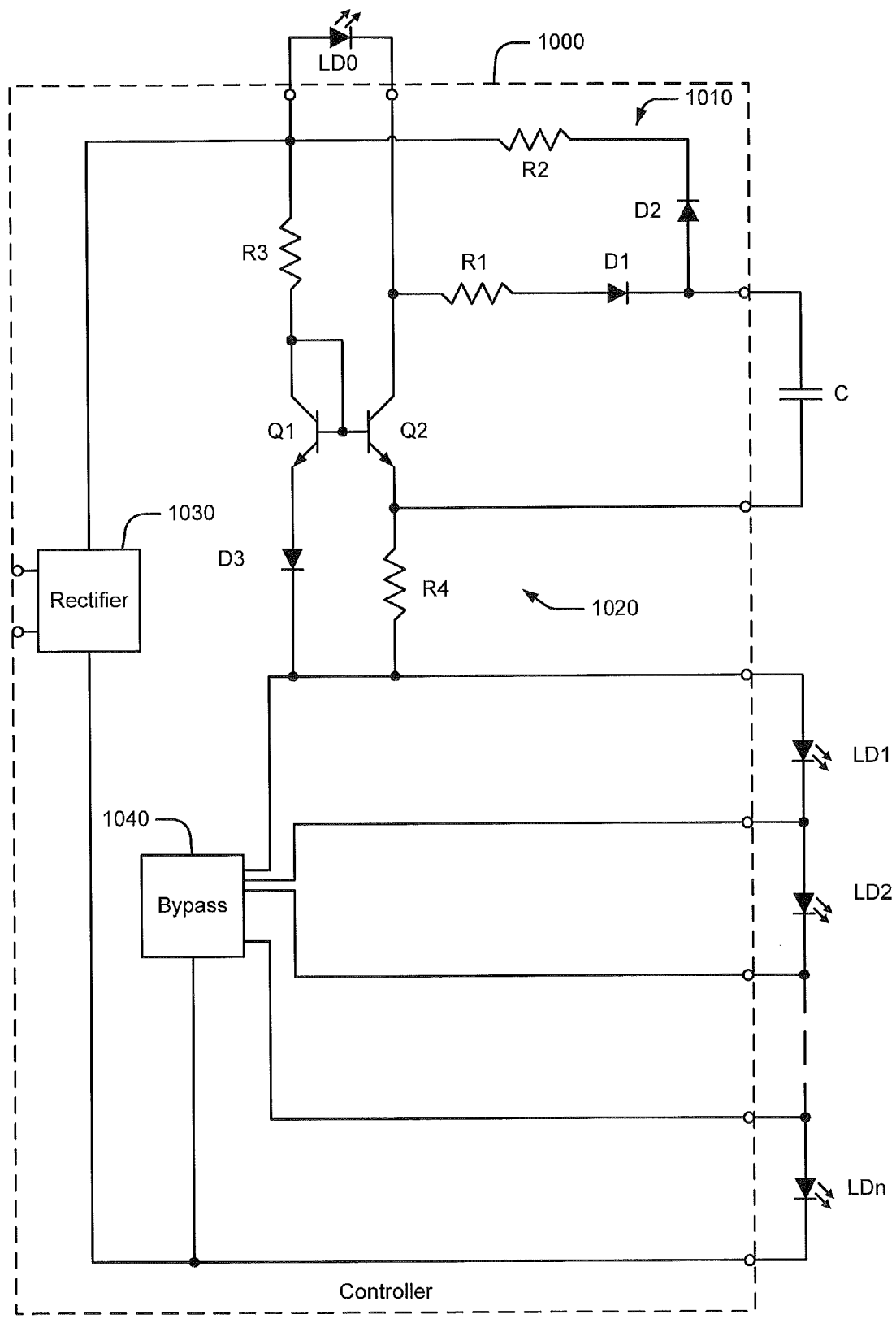

Circuitry along the lines described above with reference to FIGS. 6 and 7 may be similarly arranged. For example, FIG. 10 illustrates a controller 1000 configured to be coupled to LEDs LD0-LDn and to one or more storage capacitors C, and to receive AC power from an external source. The controller 1000 includes a switching circuit 1010 with diodes D1, D2 and resistors R1, R2, a current control circuit 1020 with transistors Q1, Q2, a diode D3, and resistors R3, R4, a rectifier circuit 1030 and a bypass circuit 1040. It will be appreciated that certain components, such as the rectifier circuit 1030, may be provided separately, providing a controller structure similar to that illustrated in FIG. 8. It will also be understood that controller structures along the lines illustrated in FIGS. 8-11 may be used with circuitry having multiple capacitive-storage lighting circuits, such as those configured along the lines of FIG. 7.

Figure 11:
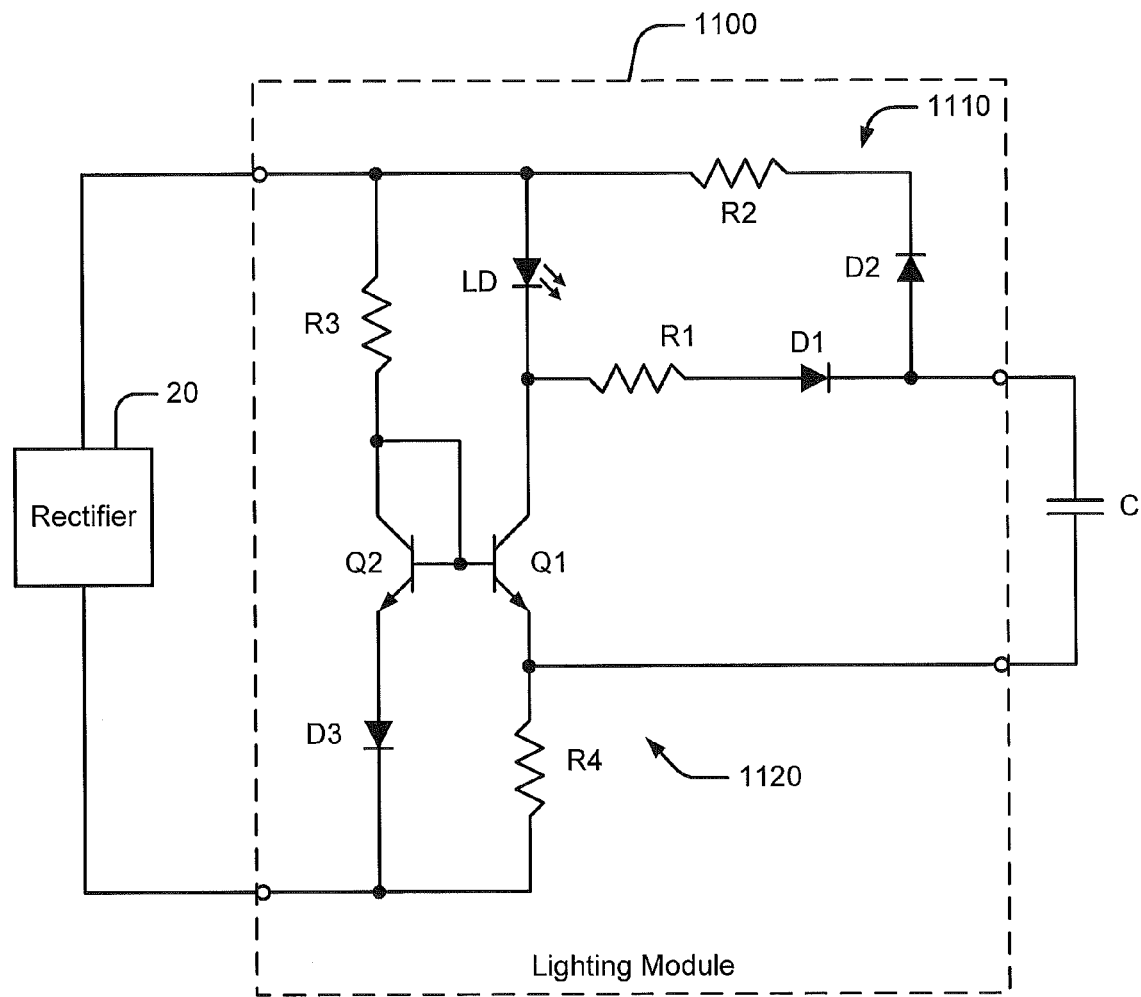
FIGS. 11 and 12 illustrate lighting modules according to various embodiments.

Some embodiments of the inventive subject matter may also be implemented as integrated lighting modules. For example, FIG. 11 illustrates a lighting module 1100 configured to be coupled to an external rectifier 20 and at least one external storage capacitor C. The lighting module 1100 may be configured along the lines described above with reference FIGS. 3-5. The lighting module 1100 includes at least LED LD, a switching circuit 1110 and a current control circuit 1120. The switching circuit 1110 includes diodes D1, D2 and resistors R1, R2. The current control circuit 1120 includes transistors Q1, Q2, resistors R3, R4 and a diode D3. It will be appreciated that lighting modules according to further embodiments may also include a rectifier circuit and/or storage capacitor(s) integrated therein.

Figure 12:
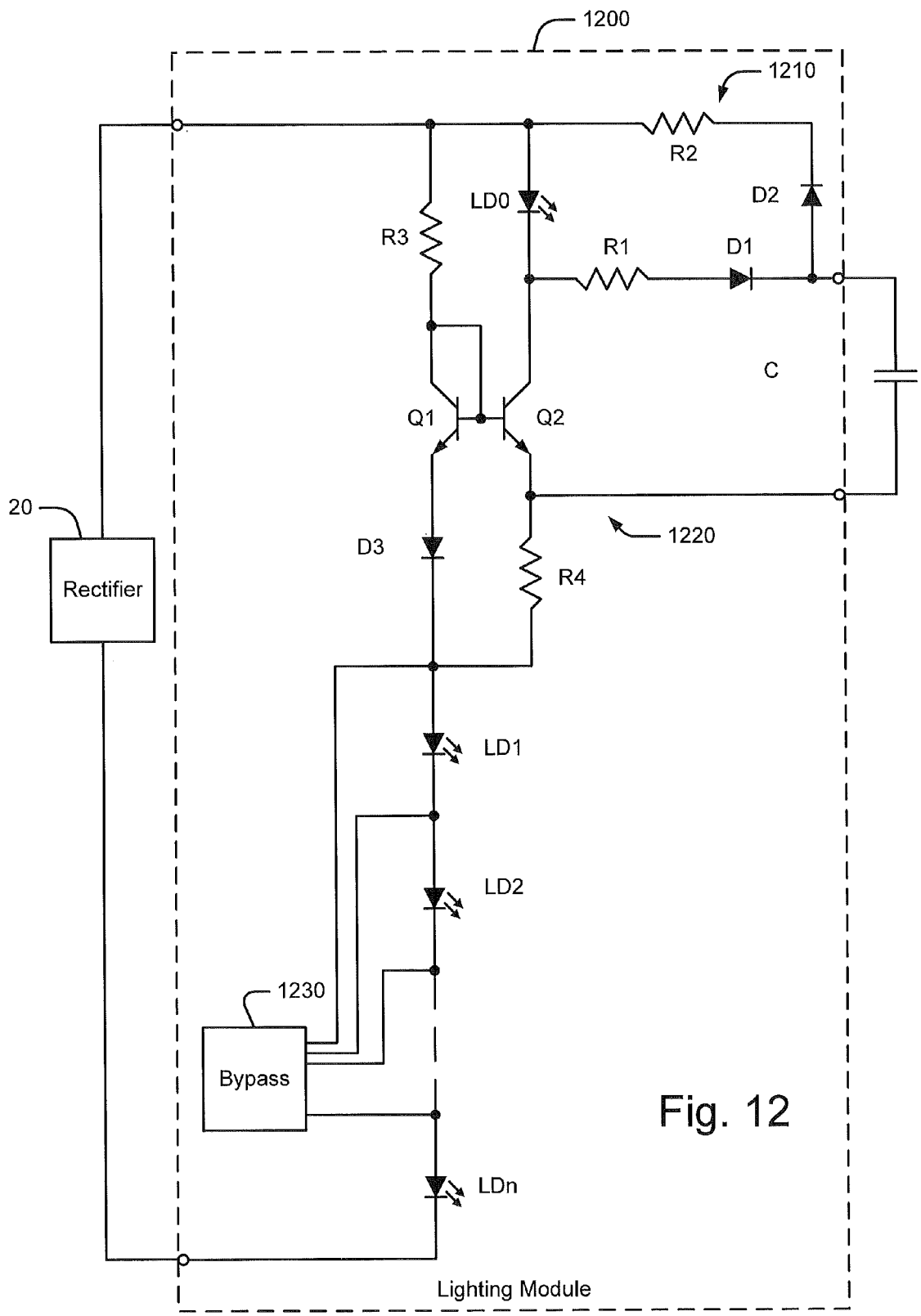

FIG. 12 illustrates a lighting module 1200 according to further embodiments, which may operate along the lines discussed above with reference to FIG. 6. The lighting module 1200 includes LEDs LD0-LDn. A switching circuit 1210 and a current control circuit 1220 are coupled to at least one LED LD0. The switching circuit 1210 is configured to control energy transfer to and from at least one storage capacitor C, which may be external to the module 1200 or integrated therein. The module 1200 further includes a bypass circuit 1230 configured to selectively bypass the other LEDs LD1-LDn. As illustrated, the module 1200 may receive rectified power from a rectifier 20. It will be appreciated that a rectifier could also be integrated in such a lighting module to support plug-in AC operation.

Figure 13:
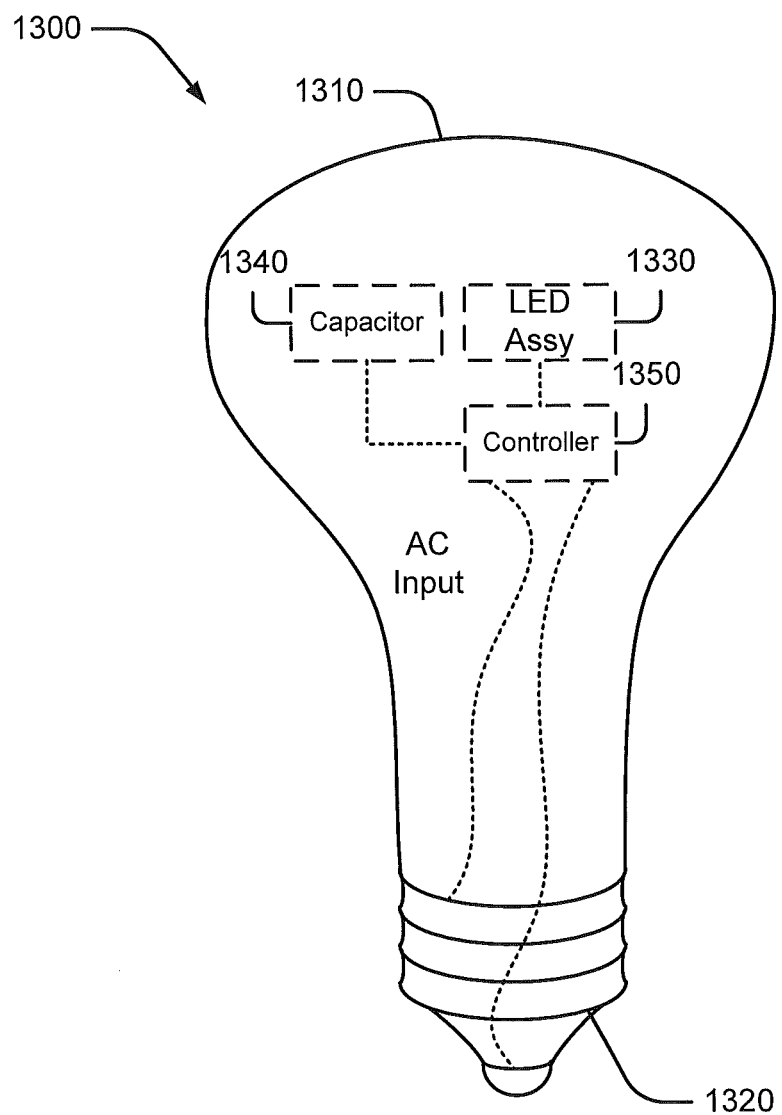
FIG. 13 illustrates a lamp assembly according to some embodiments.

As noted above, lighting apparatus according to some embodiments may be utilized in lighting fixtures, lamps and other assemblies. For example, FIG. 13 illustrates a lamp assembly 1300 according to some embodiments. The lamp assembly 1300 includes a transparent or semitransparent housing 1310, inside of which are positioned an LED assembly 1330, one or more storage capacitors 1340 and a controller module 1350, for example, a controller module along the lines discussed above with reference to FIGS. 9 and 10. The controller module 1340 is configured to receive AC power via a base connector 1320 (e.g., an Edison base or other standard lighting base). It will be appreciated that the implementation of FIG. 13 is offered for purposes of illustration, and that embodiments of the inventive subject matter may be implement in a number of different ways in a number of different types of lighting assemblies, fixtures, and systems.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

What is claimed is:

1. An apparatus comprising:
   at least one LED;
   at least one charge storage device; and
   a switching circuit configured to route current through the at least one LED to the at least one charge storage device for a first state of an applied voltage and to discharge the at least one charge storage device via the at least one LED for a second state of the applied voltage, wherein the switching circuit comprises:
   a first switch coupled between a first terminal of the at least one LED and a first terminal of the at least one charge storage device; and
   a second switch coupled between a second terminal of the at least one LED and the first terminal of the at least on charge storage device.

2. The apparatus of claim 1, further comprising a current control circuit coupled in series with the at least one LED.

3. The apparatus of claim 2, wherein the current control circuit is configured to limit a current through the at least one LED for a third state of the applied voltage.

4. The apparatus of claim 3, wherein a first terminal of the at least one LED is configured to receive the applied voltage, wherein a second terminal of the at least one LED is coupled to the current control circuit and wherein the switching circuit is configured to selectively conduct current to the at least one charge storage device from the second terminal of the at least one LED responsive to the applied voltage.

5. The apparatus of claim 2, wherein the current control circuit comprises a current mirror circuit.

6. The apparatus of claim 1, wherein the applied voltage comprises a periodically varying voltage and wherein a current through the at least one LED has a frequency twice a frequency of the applied voltage.

7. The apparatus of claim 1, wherein the first switch comprises a first diode coupled between a first terminal of the at least one LED and a first terminal of the at least one charge storage device and wherein the second switch comprises a second diode coupled between a second terminal of the at least one LED and the first terminal of the at least on charge storage device.

8. The apparatus of claim 1, wherein the switching circuit is configured to couple the at least one LED and the at least one charge storage device in series responsive to the first state of the applied voltage and to couple the at least one LED and the at least one charge storage device in parallel responsive to the second state of the applied voltage.

9. The apparatus of claim 1, further comprising a string of LEDs coupled in series with the at least one LED.

10. The apparatus of claim 9, further comprising bypass circuitry configured to selectively bypass LEDs in the string responsive to the applied voltage.

11. An apparatus comprising:
    at least one LED;
    at least one charge storage device; and
    a switching circuit configured to route current through the at least one LED to the at least one charge storage device for a first state of an applied voltage and to discharge the at least one charge storage device via the at least one LED for a second state of the applied voltage, wherein the switching circuit comprises:
    a first diode coupled between a first terminal of the at least one LED and a first terminal of the at least one charge storage device; and
    a second diode coupled between a second terminal of the at least one LED and the first terminal of the at least on charge storage device.

12. An apparatus comprising:
    a plurality of lighting circuits coupled each lighting circuit comprising:
    at least one LED;
    at least one charge storage device; and
    a switching circuit configured to route current through the least one LED to the at least one charge storage device for a first state of an applied voltage and to discharge the at least one charge storage device via the at least one LED for a second state of the applied voltage, wherein the switching circuit comprises:
    a first diode coupled between a first terminal of the at least one LED and a first terminal of the at least one charge storage device; and
    a second diode coupled between a second terminal of the at least one LED and the first terminal of the at least on charge storage device.

13. The apparatus of claim 12, wherein each of the lighting circuits further comprises a current control circuit coupled in series with the at least one LED.

14. The apparatus of claim 13, wherein the current control circuit is configured to limit a current through the at least one LED for a third state of the applied voltage.

15. An apparatus comprising:
    at least one LED;
    at least one charge storage device;
    a first switch coupled between a first terminal of the at least one LED and a first terminal of the at least one charge storage device; and
    a second switch coupled between a second terminal of the at least one LED and the first terminal of the at least one charge storage device,
    wherein the first and second switches are configured to route current through the least one LED to the at least one charge storage device for a first state of a voltage applied to the first terminal of the at least one LED and to discharge the at least one charge storage device via the at least one LED for a second state of the applied voltage.

16. The apparatus of claim 15, wherein the first and second switches comprise respective first and second diodes.

17. The apparatus of claim 15, further comprising a current control circuit coupled to the second terminal of the at least one LED.

18. The apparatus of claim 15, further comprising a string of LEDs coupled in series with the at least one LED.

19. The apparatus of claim 18, further comprising bypass circuitry configured to selectively bypass LEDs in the string responsive to the applied voltage.

20. A controller for a lighting apparatus comprising at least one LED, the controller comprising:
- a switching circuit configured to route current through the at least one LED to at least one charge storage device for a first state of an applied voltage and to discharge the at least one charge storage device via the at least one LED for a second state of the applied voltage, wherein the switching circuit comprises:
  - a first switch configured to be coupled between a first terminal of the at least one LED and a first terminal of the at least one charge storage device; and
  - a second switch configured to be coupled between a second terminal of the at least one LED and the first terminal of the at least one charge storage device.

21. The controller of claim 20, wherein the first and second switches comprise respective first and second diodes.

22. The controller of claim 20, further comprising a current control circuit configured to be coupled in series with the at least one LED.

23. The controller of claim 20, further comprising the at least one charge storage device.

* * * * *